US 6,735,929 B2

(12) United States Patent
Watts et al.

(10) Patent No.: US 6,735,929 B2
(45) Date of Patent: May 18, 2004

(54) MULTIFUNCTION LATCH FOR A COMBINE

(75) Inventors: Bradley James Watts, Eldridge, IA (US); Klaus Ernst Becker, East Moline, IL (US); Scott Robert Bowers, Geneseo, IL (US); Michael Dwain Benhart, Rock Island, IL (US); Ronald Leo Sheedy, Eldridge, IA (US); Keith Allan Moreland, Aledo, IL (US); Walter Emmert, Contwig (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/100,384

(22) Filed: Mar. 18, 2002

(65) Prior Publication Data

US 2003/0172637 A1 Sep. 18, 2003

(51) Int. Cl.⁷ .............................................. A01D 34/04
(52) U.S. Cl. ...................................................... 56/14.9
(58) Field of Search ............................... 56/14.9, 14.5, 56/14.6, 11.1, 11.2, 11.3, 10.9, 192, 193, 153, DIG. 1, DIG. 5, DIG. 21; 460/16, 20, 116, 119

(56) References Cited

U.S. PATENT DOCUMENTS

| | | | | | |
|---|---|---|---|---|---|
| 3,324,637 | A | * | 6/1967 | Ashton et al. | 56/15.6 |
| 4,046,399 | A | | 9/1977 | Zeuner et al. | 280/420 |
| 4,227,363 | A | * | 10/1980 | Kerber et al. | 56/10.2 E |
| 4,253,295 | A | * | 3/1981 | Knepper | 56/15.6 |
| 4,266,391 | A | * | 5/1981 | McDuffie et al. | 56/14.5 |
| 4,280,317 | A | * | 7/1981 | Lindblom et al. | 56/15.6 |
| 4,444,000 | A | * | 4/1984 | Enzmann et al. | 56/15.6 |
| 4,612,757 | A | * | 9/1986 | Halls et al. | 56/10.2 E |
| 4,733,523 | A | * | 3/1988 | Dedeyne et al. | 56/209 |
| 5,832,705 | A | | 11/1998 | Eis et al. | 56/14.9 |
| 6,318,057 | B1 | * | 11/2001 | Bürmann | 56/10.2 R |
| 6,478,094 | B2 | * | 11/2002 | Alexander et al. | 172/439 |
| 6,519,923 | B1 | * | 2/2003 | Cooksey et al. | 56/14.9 |

FOREIGN PATENT DOCUMENTS

| | | | | |
|---|---|---|---|---|
| DE | 2111227 | * | 9/1971 | .......... A01D/41/12 |
| DE | 44 12 111 A1 | | 10/1995 | |
| DE | 44 12 114 A1 | | 10/1995 | |
| DE | 44 12 116 A1 | | 10/1995 | |
| DE | 44 29 384 C1 | | 2/1996 | |
| DE | 195 36 345 C2 | | 4/1997 | |
| DE | 196 39 217 A1 | | 4/1997 | |
| DE | 199 49 213 A1 | | 8/2001 | |
| EP | 0 302 027 B1 | | 2/1989 | |
| EP | 0 676 123 A1 | | 10/1995 | |

OTHER PUBLICATIONS

Photographs taken approximately Nov. 14, 2001 at an agricultural product show known as Agritechnics in Hanover, Germany showing the latching mechanism which couples a harvesting assembly to a combine manufactured by a company known as John Deere., 4 pages.

Photographs taken approximately Nov. 14, 2001 at an agricultural product show known as Agritechnics in Hanover, Germany showing the latching mechanism which couples a harvesting assembly to a combine manufactured by a company known as Claas., 4 pages.

Photographs taken approximately Nov. 14, 2001 at an agricultural product show known as Agritechnics in Hanover, Germany showing the latching mechanism which couples a harvesting assembly to a combine manufactured by a company known as Case., 2 pages.

(List continued on next page.)

Primary Examiner—Árpád Fábián Kovács

(57) ABSTRACT

A mechanism for attaching a harvesting assembly to a combine having a multicoupler which connects hydraulic lines on the combine with hydraulic lines on the harvesting assembly as two halves of the multicoupler are brought together, and a latching mechanism which mechanically couples the harvesting assembly to the combine, the latching mechanism being operatively connected with the multicoupler to shift between latched and unlatched modes as the multicoupler is shifted between connected and unconnected modes.

2 Claims, 4 Drawing Sheets

OTHER PUBLICATIONS

Photographs taken approximately Nov. 14, 2001 at an agricultural product show known as Agritechnics in Hanover, Germany showing the latching mechanism which couples a harvesting assembly to a combine manufactured by a company known as New Holland., 4 pages.

Photographs taken approximately Nov. 14, 2001 at an agricultural product show known as Agritechnics in Hanover, Germany showing the latching mechanism which couples a harvesting assembly to a combine manufactured by a company known as Fahr., 1 page.

Photographs taken approximately Nov. 14, 2001 at an agricultural product show known as Agritechnics in Hanover, Germany showing the latching mechanism which couples a harvesting assembly to a combine manufactured by a company known as Fahr Deutz., 2 page.

Photographs taken approximately Nov. 14, 2001 at an agricultural product show known as Agritechnics in Hanover, Germany showing the latching mechanism which couples a harvesting assembly to a combine manufactured by a company known as Massey Ferguson., 4 pages.

* cited by examiner

MULTIFUNCTION LATCH FOR A COMBINE

FIELD OF THE INVENTION

This invention relates to mechanisms that latch a harvesting assembly to a combine vehicle.

BACKGROUND OF THE INVENTION

Agricultural combine vehicles operate to harvest crops at the front of the vehicle and then transport the harvested crops rearwardly into the body of the combine vehicle for further processing. These combine vehicles are provided with a harvesting assembly that is attached to the front of the combine vehicle. Different harvesting assemblies can be attached to the front of the combine for harvesting different crops. For example, a harvesting assembly known as a cutting platform can be attached to the front of the combine for harvesting wheat. A harvesting assembly known as a corn head can be attached for harvesting corn.

It is known to provide latching mechanisms which serve to attach or fix the harvesting assemblies to the front of combine vehicles. The latching mechanisms have included shiftable pins carried by the combine which shift outwardly to engage holes in the harvesting assembly. The pins within the holes fix the harvesting assembly to the combine vehicle. Some combines require the operator to engage each pin separately by walking to each side of the combine to manually shift each pin with a separate operation. Another type of combine provides a latching mechanism that allows an operator to retract the pins simultaneously by engaging a linkage while standing on one side of the vehicle. Other combines provide other systems that do not utilize pins for securing or latching the harvesting assembly to the combine for harvesting operations.

Many harvesting assemblies include mechanisms that are hydraulically driven by a hydraulic system carried by the combine. Hydraulic lines extend forwardly from the combine's hydraulic system. Hydraulic lines on the harvesting assembly must be attached to the appropriate hydraulic lines on the combine so that the harvesting assembly will be hydraulically connected to and driven by the combine's hydraulic system. Some combines require that several hydraulic lines from the combine be separately manually attached by the operator to respective hydraulic lines on the harvesting assembly. Other combines provide multicouplers or gang couplers which serve to couple several hydraulic lines from the combine with the plurality of corresponding hydraulic lines on the harvesting assembly. This reduces the time required of the operator to hydraulically connect the various hydraulic lines, because they are all connected in a single operation as the two halves of the multicoupler are secured together.

Some combines also provide electrical power to the harvesting assemblies for allowing the harvesting assembly to perform certain functions, such as operate turn signals or warning lights on the harvesting assembly. With some combines the operator is required to manually attach the electrical lines and then manually attach the hydraulic lines. Other combines provide multicouplers having two halved into which the ends of the electrical lines from the harvesting assembly and the combine extend. When the two halves of the multicoupler are brought together the electrical lines become electrically coupled together in proper fashion. These multicouplers thereby serve to couple the electrical lines simultaneous with the connection of the hydraulic lines as the two halves of the multicoupler are secured together.

The operation of switching harvesting assemblies includes the steps of detaching the hydraulic and electrical lines, unlatching the latching mechanism and then physically removing the harvesting assembly from the combine vehicle. The operator must then physically attach the other harvesting assembly to the combine vehicle, engage the latching mechanism, and then attach the hydraulic lines and electrical lines.

It would be desirable to provide a mechanism that simplifies the changeover operation for the operator, and that reduces the time required of the operator to perform the changeover operation.

SUMMARY OF THE INVENTION

The present invention provides an agricultural combine with a mechanism for attaching a harvesting assembly to the combine. A multicoupler is provided which operatively connects hydraulic lines on the combine with hydraulic lines on the harvesting assembly when in a connected mode, and which disconnect said hydraulic lines when in an unconnected mode. A latching mechanism is provided which mechanically couples the harvesting assembly to the combine. The latching mechanism is operatively connected with the multicoupler to shift between latched and unlatched modes as the multicoupler is shifted between the connected and unconnected modes.

The multicoupler according to the present invention includes two halves which are secured together as an operator shifts a lever. A push pull cable extends between the latching mechanism and the lever for shifting the latching mechanism between the latched and unlatched modes as the lever is shifted to change the multicoupler between the connected and unconnected modes.

DESCRIPTION OF THE PREFERRED EMBODIMENT

Figure 1:
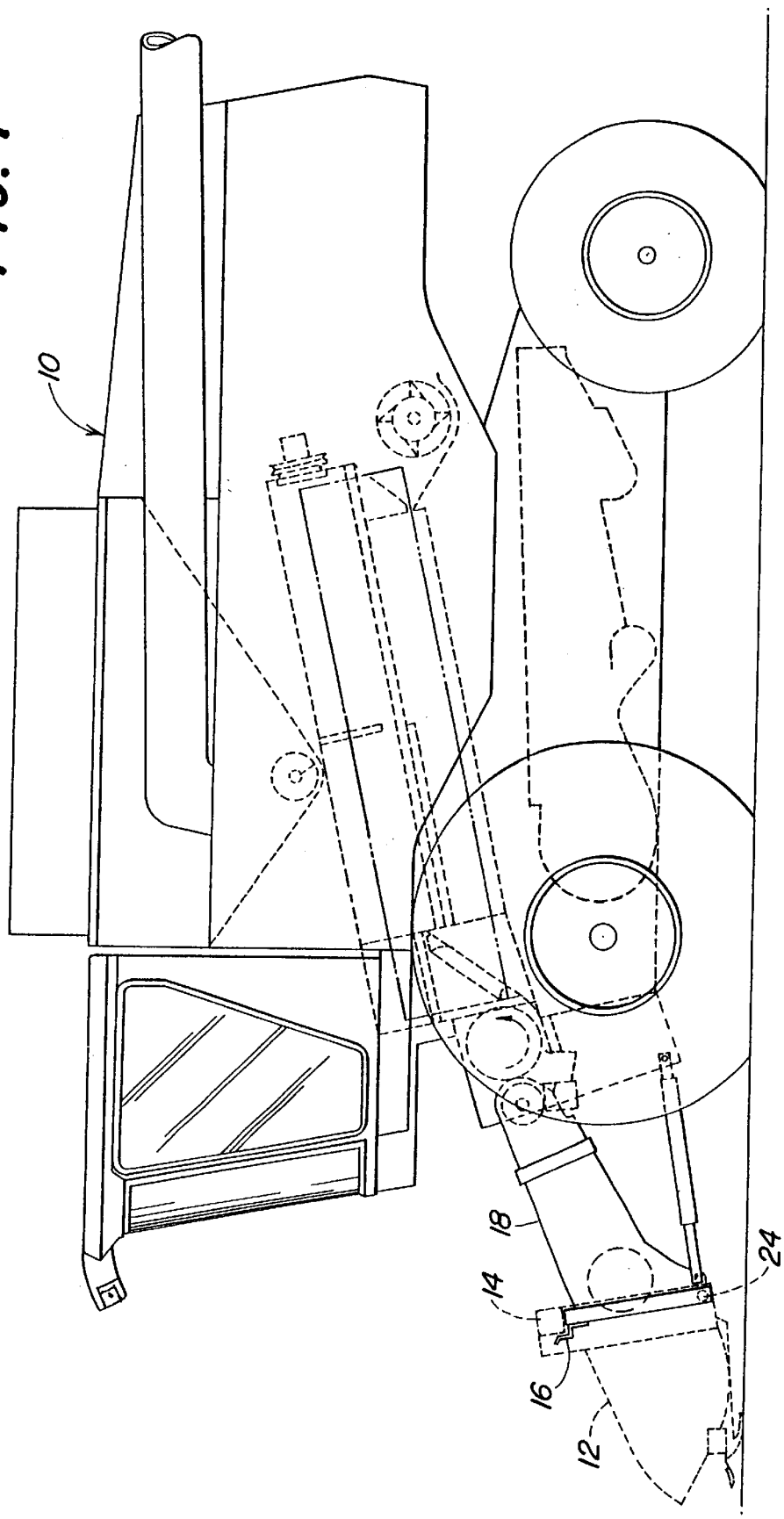
FIG. 1 is a side view of a combine having a feederhouse and harvesting assembly attached to the front of the combine, with the multifunction latch according to the present invention.

Referring now to FIG. 1, there is shown a representational view of a combine vehicle 10 with a harvesting assembly 12 attached to the front of the combine vehicle 10. A beam 14 at the upper rear portion of the harvesting assembly 12 is supported by a pair of bracket members 16 carried at the top front portion of the feederhouse 18 carried by the combine vehicle 10. As will be discussed in more detail below, pins 20 of a latching mechanism 22 are carried at the lower front portion of the feederhouse 18 and are engaged within openings 24 defined by the harvesting assembly 12. The pins 20 within the openings 24 and the beam 14 in engagement with the bracket members 16 of the feederhouse 18 serve to operatively secure the harvesting assembly 12 in proper position against the front of the feederhouse 18.

Figure 2:
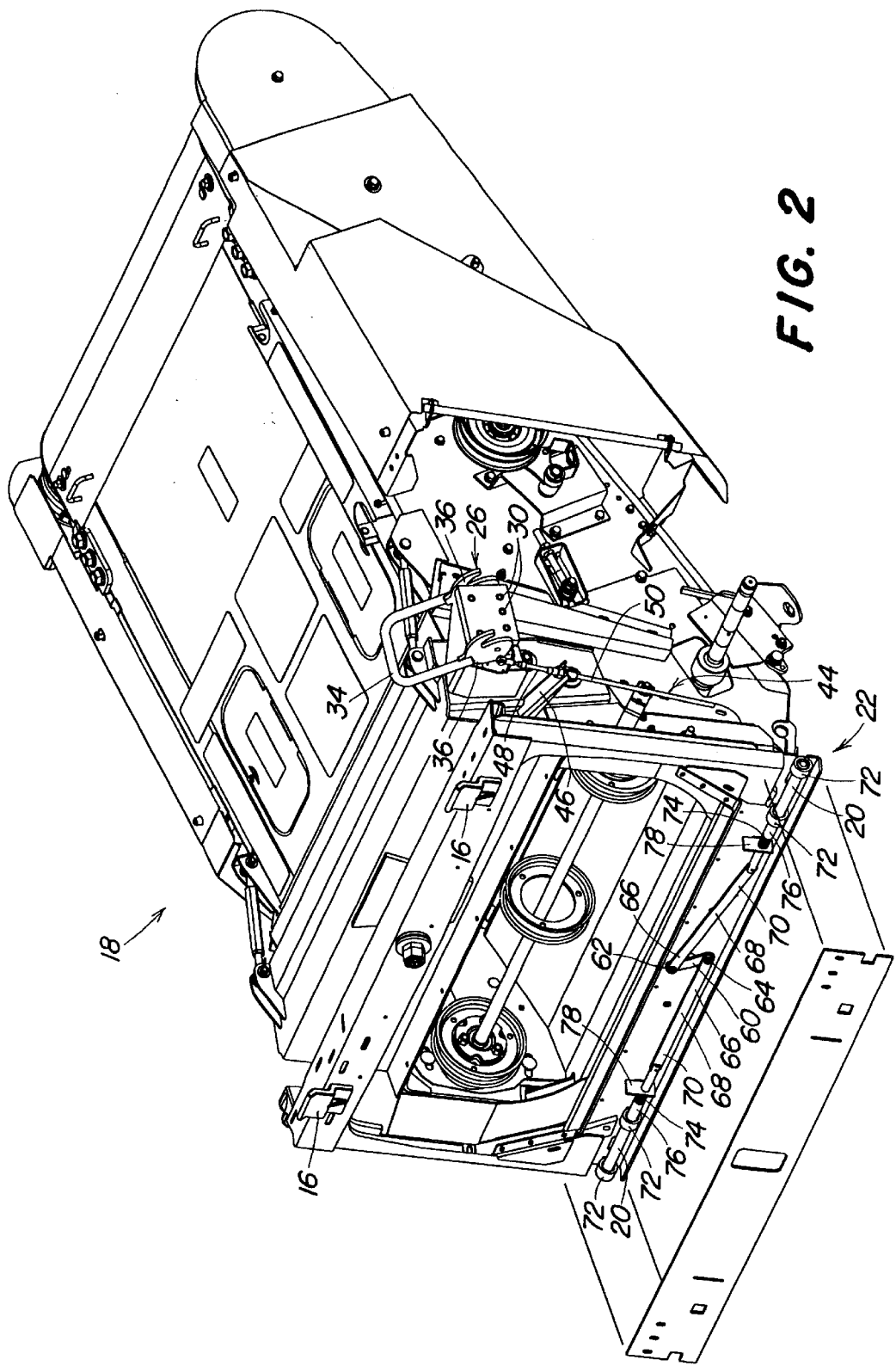
FIG. 2 is a partial perspective view of the front end portion of the feederhouse of FIG. 1, showing the multifunction latch according to the present invention.
Figure 3:
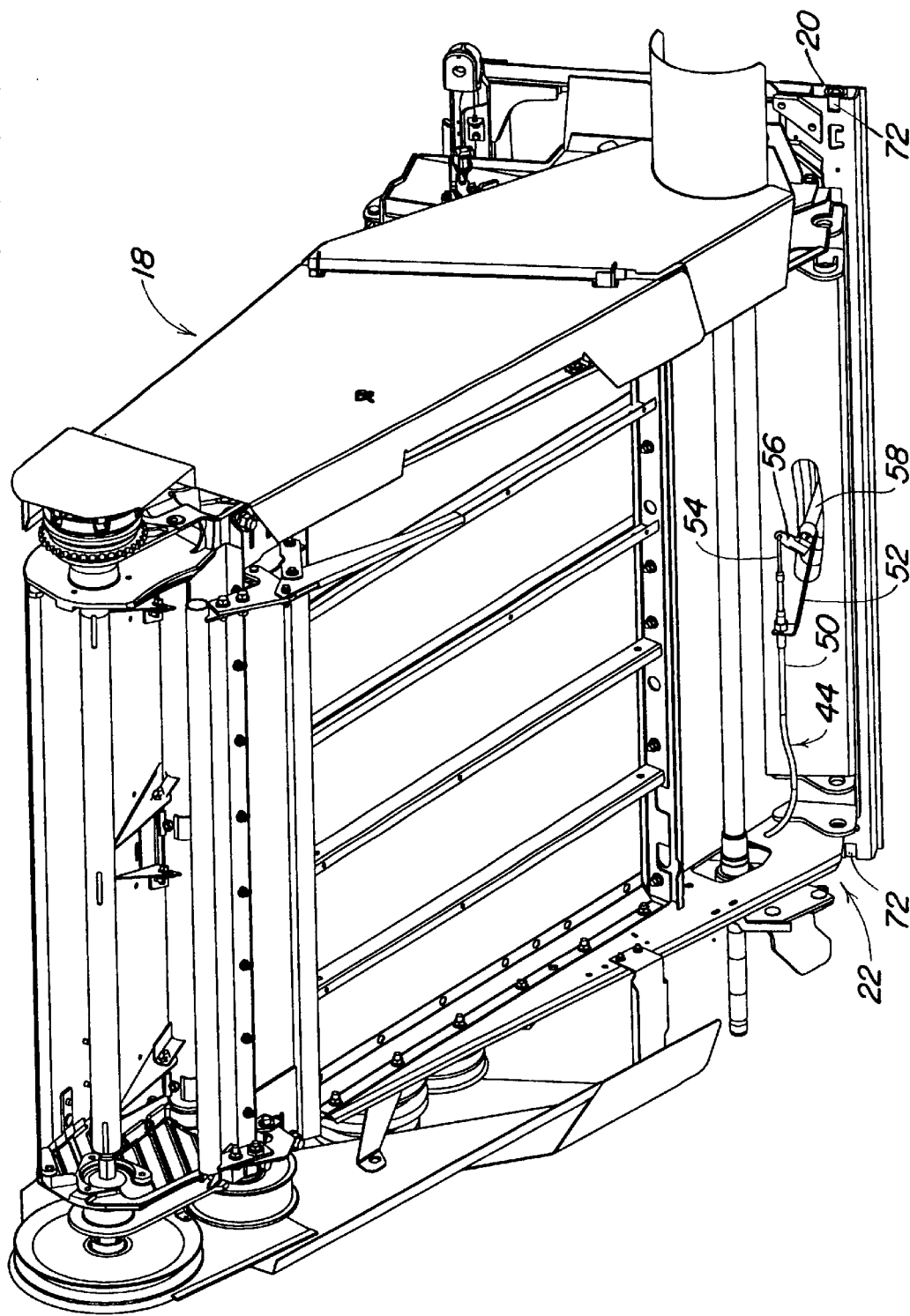
FIG. 3 is a partial perspective view from beneath and behind the feederhouse of FIGS. 1 and 2, showing the lower end portion of the push pull cable of the latch mechanism.
Figure 4:
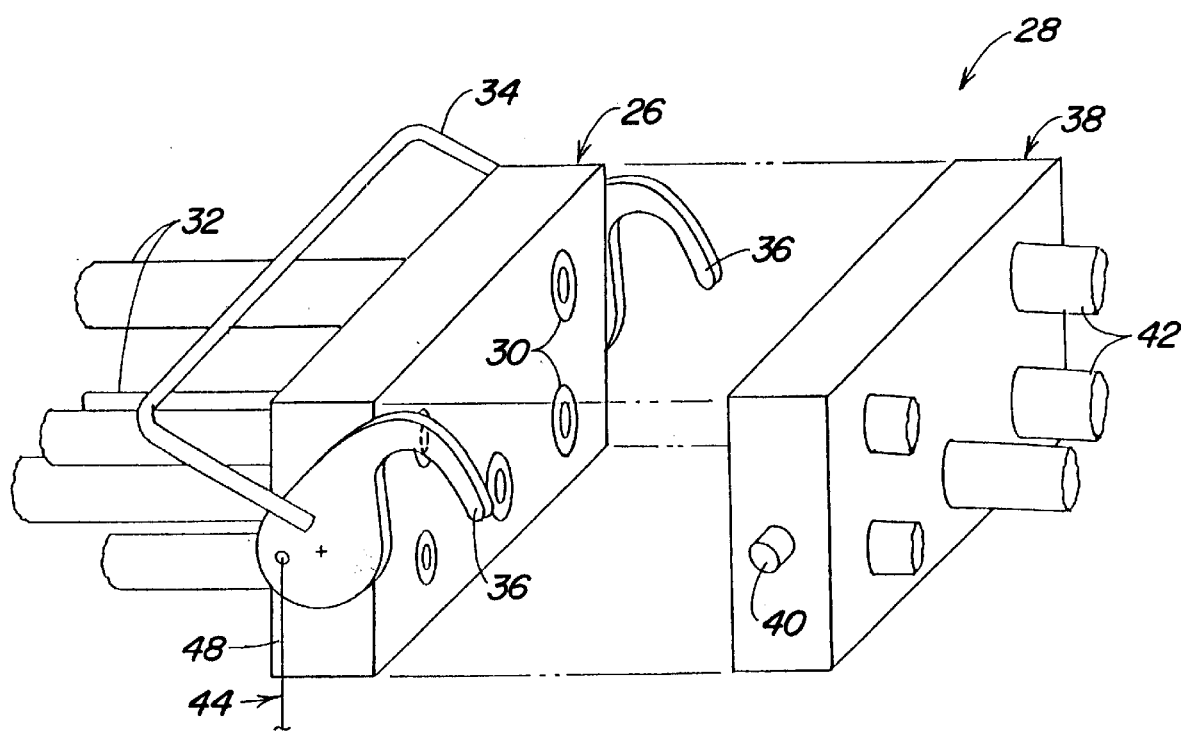
FIG. 4 is a representational view of the multicoupler to which the push pull cable is coupled in accordance with the present invention.

Referring now to FIG. 2, there is shown a partial view of the front portion of the feederhouse 18. A combine half 26 of a multicoupler 28 is mounted to the side of the feederhouse 18. The combine half 26 of the multicoupler 28 includes several ports 30 into which hydraulic lines 32 from the combine 10 extend from the backside of the multicoupler 28. The combine half 26 of the multicoupler 28, as best seen in FIGS. 2 and 4, includes a pivotable lever 34 to which a pair of hook members 36 are fixed for pivoting therewith. As an operator positions a harvesting assembly portion 38 of the multicoupler 28 against the combine portion 26 of the multicoupler 28, the operator can shift the lever 34 downwardly, causing the hook members 36 to engage respective pegs 40 defined on the sides of the harvesting assembly half 38 of the multicoupler 28. With the lever 34 shifted fully downwardly, the hook members 36 serve to pull the harvesting assembly half 38 tight against the combine half 26 of the multicoupler 28 to thereby connect hydraulic lines 32 from the combine 10 with the hydraulic lines 42 on the harvesting assembly 12, and also electrical lines from the combine 10 with electrical lines of the harvesting assembly 12.

Operatively connected to the lever 34 is a push pull cable 44 which forms part of the latching mechanism 22. A first support member 46 rigidly supports the upper end portion 48 of the housing or sheath 50 of the push pull cable 44. The cable 44 extends downwardly from the first support member 46 into the interior of the feederhouse 18. A second support member 52 rigidly supports the lower end portion 54 of the housing 50 of the cable 44. The lower end 54 of the cable 44 is attached to an arm 56 fixed with a rear end portion of a shaft 58. The shaft 58 extends forwardly therefrom and includes a front end portion fixed with a pivotable member 60. The pivotable member 60 includes upper and lower ends 62 and 64 to which inner ends 66 of link members 68 are coupled. The outer ends 70 of the link members 68 are operatively coupled with respective left and right pin members 20. The pin members 20 are supported within sleeve members 72. Springs 74 are compressed between a shoulder 76 of each pin member 20 and an abutment element 78 fixed with the framework of the feederhouse 18. The compression springs 74 serve to bias the pins 20 outwardly.

Next, the operation of the present invention will be described in greater detail. To attach a harvesting assembly 12 to the front end of the combine's feederhouse 18, the operator will drive the combine 10 into position directly behind the harvesting assembly 12 to be attached. By engaging controls within the cab of the combine 10, the operator will then manipulate the position of the feederhouse 18 so that the bracket members 16 are engaged beneath the beam 14 at the top of the harvesting assembly 12. The operator will then manipulate controls within the cab of the combine 10 to lift the front end of the feederhouse 18, thereby lifting the harvesting assembly 12 and causing the pins 20 to become aligned with the associated openings in the harvesting assembly 12. The operator then exits the cab and walks to the left side of the feederhouse 18. He then grasps the harvesting assembly half 38 of the multicoupler 28 which is dangling loosely from the harvesting assembly 12, and places it against the combine portion 26 of the multicoupler 28. The operator then pulls the lever 34 toward himself, which shifts the hooks 36 around the pegs 40, pulling the two halves 26 and 38 of the multicoupler 28 toward each other and securing the two halves 26 and 38 together. Quick couplers at the ends of the hydraulic lines engage each other as the two halves 26 and 38 of the multicoupler 28 are secured together, thereby hydraulically connecting the appropriate hydraulic lines 32 of the combine 10 with the hydraulic lines 42 of the harvesting assembly 12. Electrical lines whose ends are held by the two halves of the multicoupler 28 are also brought together so that the electrical lines from the combine 10 are electrically connected to the appropriate electrical lines on the harvesting assembly 12.

As the operator shifts the lever 34 toward himself as he stands on the left side of the feederhouse 18 next to the combine 10, the cable 44 will be pulled upwardly within its housing 50. This causes the lower end 54 of the cable 44 to shift toward the left side of the vehicle 10, causing the top end of the arm 56 to shift therewith. The shaft 58 pivots with the arm 56, which causes the pivotable member 60 to pivot about the axis defined by the shaft 58. The upper end 62 of the pivotable member 60 will shift toward the left side of the vehicle 10, and the lower end 64 of the pivotable member 60 will shift toward the right side of the vehicle 10. This motion of the pivotable member 60 shifts the link members 68 and pin members 20 outwardly. The pin members 20 thereby shift laterally outwardly into the openings 24 defined in the harvesting assembly 12. With the pins 20 positioned within the openings 24 in this fashion the harvesting assembly 12 is securely fixed with the front of the feederhouse 18 of the combine 10 for harvesting operations.

The operator can also change harvesting assemblies to accommodate harvesting operations in a different crop. To do so the operator must remove the harvesting assembly 12 currently mounted to the combine 10. The operator first stands on the left side of the feederhouse 18 and presses the lever 34 away from himself. This pivots the hook members 36 upwardly, releasing the peg members 40 from the hook members 36. The harvesting assembly portion 38 of the multicoupler 28 can then be removed from the combine portion 26 of the multicoupler 28, which operatively disconnect the hydraulic and electric lines of the combine 10 from those of the harvesting assembly 12. As the lever 34 is shifted toward the center of the feederhouse 18, the upper end of the cable 44 is pushed downwardly within its housing 50. This causes the lower end of the cable 44 to be pushed toward the right side of the combine 10, which shifts the top portion of the arm 56 in that direction as well. This pivots the shaft 58 such that the top end 62 of the pivotable member 60 swings toward the right side of the combine 10 and the lower end 64 of the pivotable member 60 swings toward the left side of the combine 10. This in turn pulls the link members 68 and pin members 20 inwardly toward the centerline of the feederhouse 18. As the pins 20 are pulled inwardly they are pulled out of the openings 24 in the harvesting assembly 12, thereby providing clearance for the harvesting assembly 12 to be detached from the front of the feederhouse 18. The operator then climbs into the cab and uses the controls in the cab to lower the front of the feederhouse 18 until the bracket members 16 are clear of the beam member 14. The operator can then drive the combine 10 in reverse away from the harvesting assembly 12, and drive the combine 10 to another harvesting assembly that is to be mounted to the combine 10.

By coupling the latching mechanism 22 with the lever 34 of the multicoupler 28, the present invention provides a mechanism that combines the operation of attaching the hydraulic and electric lines with the operation of physically latching the harvesting assembly 12 to the feederhouse 18 of the combine 10. As the operator shifts the lever 34 toward himself, the two halves 26 and 38 of the multicoupler 28 are brought together and the latching mechanism 22 automatically latches the harvesting assembly 12 to the front of the feederhouse 18. The push pull cable 44 of the latching mechanism 22 is coupled with the lever 34 of the multicoupler 28, and thereby serves to operatively couple the latching mechanism 22 with the multicoupler 28 to automatically shift the latching mechanism 22 between latched and unlatched modes as the multicoupler 28 is shifted between the connected and unconnected modes. The present invention simplifies the changeover operations, resulting in a corresponding reduction in time required to attach and detach a harvesting assembly 12. The time required to perform harvesting assembly changeover operations is resultingly reduced.

Having described the preferred embodiment, it will become apparent that various modifications can be made without departing from the scope of the invention as defined in the accompanying claims.

What is claimed is:

1. An agricultural combine having a mechanism for attaching a harvesting assembly to the combine, comprising:

a multicoupler which operatively connects lines on the combine with lines on the harvesting assembly when in a connected mode, and which disconnect said lines when in an unconnected mode, and a latching mechanism which mechanically couples the harvesting assembly to the combine, said latching mechanism being operatively connected with the multicoupler to automatically shift between latched and unlatched modes as the multicoupler is shifted between the connected and unconnected modes, said multicoupler further comprises a lever which is shiftable for locking two halves of the multicoupler together in the connected mode, and said latching mechanism is operatively connected with said lever for automatically shifting between the latched and unlatched modes as the lever is shifted to change the multicoupler between the connected and unconnected modes, said latching mechanism further comprising a pair of pin members shiftable between a latched mode wherein said pins operatively engage the harvesting assembly for coupling said harvesting assembly to the combine and an unlatched mode wherein said pins disengage the harvesting assembly for allowing said harvesting assembly to be uncoupled from the combine, and a single push pull cable is operatively connected between the lever and both pin members for shifting the pin members between modes as the lever shifts.

2. An agricultural combine having a mechanism for attaching a harvesting assembly to the combine, comprising:

a multicoupler which operatively connects hydraulic lines on the combine with hydraulic lines on the harvesting assembly when in a connected mode, and which disconnect said hydraulic lines when in an unconnected mode, and a latching mechanism which mechanically couples the harvesting assembly to the combine, said latching mechanism being operatively connected with the multicoupler to automatically shift between latched and unlatched modes as the multicoupler is shifted between the connected and unconnected modes, said multicoupler further comprises a lever which is shiftable for locking two halves of the multicoupler together in the connected mode, and said latching mechanism is operatively connected with said lever for automatically shifting between the latched and unlatched modes as the lever is shifted to change the multicoupler between the connected and unconnected modes, said latching mechanism further comprising a pair of pin members shiftable between a latched mode wherein said pins operatively engage the harvesting assembly for coupling said harvesting assembly to the combine and an unlatched mode wherein said pins disengage the harvesting assembly for allowing said harvesting assembly to be uncoupled from the combine, and a single push pull cable is operatively connected between the lever and both pin members for shifting the pin members between modes as the lever shifts.

* * * * *